Nov. 20, 1951     R. E. A. J. FRÉCHIN     2,575,551

PROCESS FOR EXTRACTING GELATIN AND GLUE

Filed June 7, 1948     2 SHEETS—SHEET 1

Inventor
René E. A. J. Fréchin
by Stevens Davis & Miller
his attorneys

Nov. 20, 1951     R. E. A. J. FRÉCHIN     2,575,551
PROCESS FOR EXTRACTING GELATIN AND GLUE

Filed June 7, 1948     2 SHEETS—SHEET 2

Patented Nov. 20, 1951

2,575,551

UNITED STATES PATENT OFFICE 2,575,551

PROCESS FOR EXTRACTING GELATIN AND GLUE

René E. A. J. Frechin, Darnac, France

Application June 7, 1948, Serial No. 31,516
In France July 1, 1947

3 Claims. (Cl. 260—118)

It is known that gelatins and certain kinds of glues can be produced from animal tissues, such glues being frequently distinguished by an origin name (such as skin glue, bone glue, fish glue). These products are formed from the collagen material in animal tissues.

Gelatin glue was extracted in the past from hide waste which was boiled in water in a vat heated by a free flame, thereby converting the collagen material into gelatin glue, and one or more batches of broth or stock were thus obtained. Those prior processes have been improved by employing autoclaves heated with steam under pressure, particularly for the production of glue from ossein. The periods of time required for extraction have thus been reduced and a better grade of products secured. However, when shredded rabbit skins or skin waste are used as starting materials they become felted in the process of cooking, and filtration is difficult or impossible to perform where large volumes of stock are dealt with.

It is a primary object of this invention to provide a process which enables gelatin to be easily obtained from starting materials capable of felting.

A further object is to provide a process whereby the period of time required for treatment is relatively short, it being known that the grade of a gelatin, whatever the starting material employed for its production may be, is better as the time of manufacture is shorter.

A still further object is to provide a process for the production of gelatin which can be performed continuously.

Further objects will in part be obvious and in part become apparent as the specification proceeds.

According to this invention, I provide an extraction process particularly for the production of glues, gelatins and the like wherein comminuted starting material is passed in the form of a rod, ribbon, band or like elongated, loose assembly, countercurrently with an aqueous extraction liquid, and a pressure which gradually increases then gradually decreases as the material travels through the extraction zone is caused to prevail in said zone, while the said zone is heated. In particular, a temperature gradient may be provided in the extraction zone so that operation takes place at the highest temperature where the pressure is maximum. In this connection, care will be taken to maintain throughout the extraction process a temperature close to but below the boiling point of the extracting liquid under the prevailing pressure.

In the preferred procedure the material to be extracted is passed through an extraction zone in the form of a rod, ribbon, band or the like comprised by a plurality of nearly juxtaposed although separate sections, and the extracting medium is caused to travel through narrow passages between two successive sections for passing from one of said sections to the next one. Owing to this feature, a stirring action favourable in respect of extraction efficiency and lack of felting is produced in each of said sections which consists of bits of material loosely grouped together.

A convenient and advantageous manner of carrying out the above process comprises providing a variable hydrostatic pressure by arranging the extraction zone as a passage having a downwrdly directed portion, an upwardly directed portion and an intermediate horizontal bridging portion, thus, in particular as a U-shaped passage.

My invention further comprises an apparatus for carrying out the process as above described.

In order that the structure and operation of this apparatus may be understood more readily, reference will now be had to the appended drawing which shows by way of non-limiting example, the preferred embodiment of such an apparatus, it being understood that my invention is not restricted thereto.

Figure 1:
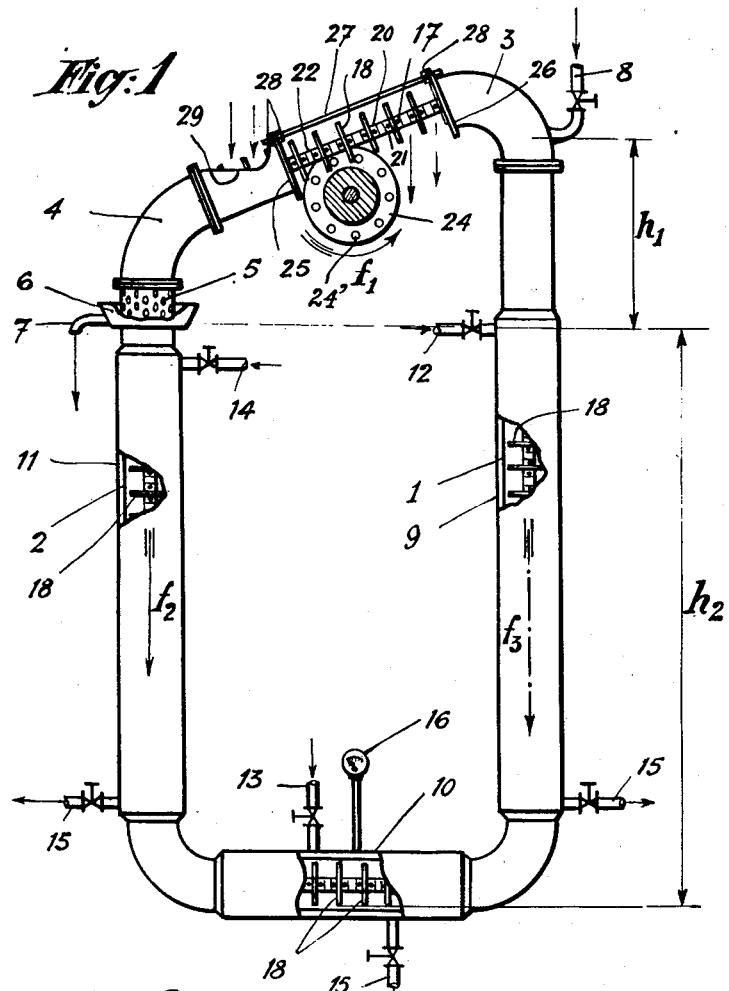
Fig. 1 is an elevation view thereof with parts broken away.

In the example selected for the purpose of illustration, my apparatus comprises a tubular passage way of general U shape, providing a guide for a tray or bucket conveyor.

The passage way is defined by a tube or an assembly of tube sections which delineates a U, one leg of which 1 is longer than the other leg 2, the legs having top extensions 3 and 4 bent towards one another. The tube or tube sections are made of a material capable of withstanding the action of hot acid or basic liquors, or provided with an inner lining of such a material.

The shorter leg 2 is perforated at 5 in its top portion and a collecting basin or trough 6 having an exit spout 7 providing for overflow is arranged around the same. Opening into the top portion of the passage way, above the level of the bottom of collecting basin 6 is a duct 8 for the supply of extracting liquid.

Heating means are combined with the U passage way to supply heat to substances being treated; such means may prevail throughout the length of the U passageway, or they may be provided locally at desired places. In the showing, fluid jackets for indirect heating, specifically steam jackets 9, 10, 11 with steam inlet valved pipes 12, 13, 14 and valved vent pipes or condensed water traps 15, have been illustrated. The rate of supply of steam and as the case may be the temperature of steam may be controlled separately for each jacket. Measurement devices such as thermometers, pressure gauges and the like may be associated with each jacket or at least, as shown, with the jacket around the U base or with the corresponding portion of the passageway; I have shown at 16 a pressure gauge indicating steam pressure in jacket 10.

Arranged to travel lengthwise within the passageway is an endless chain conveyor, which passes in exposed position from the extension 3 of leg 1 to the extension 4 of leg 2. The conveyor generally denoted by reference character 17 comprises a series of trays or plates 18 each of which has a multiplicity of apertures 19 therethrough and is clamped in its center portion between two clevises or forks 20, 21, assembled together by screwing. The adjacent clevises for two successive plates are coupled together through links 22 connected by pivot pins 23 with said clevises.

The conveyor is driven round continuously or intermittently by a wheel 24 having a peripheral groove in which the plates 18 enter in turn to be pushed by pins or dogs 24' provided for example near the outer periphery of the wheel. For the purpose of enabling the tension of the conveyor to be adjusted, facing flanges 25, 26 provided at the adjacent ends of extensions 3, 4 are coupled together by one or more ties 27 with adjusting nuts 28 which provide a convenient although non limiting means for adjusting tension by taking into account the flexibility of the U tube or tube section assembly.

In its upper part, extension 4 prolonging the shorter U leg 2 is cut away at 29 for the supply of material to be treated.

The operation of the apparatus is as follows:

Let us suppose that wheel 24 driven in any suitable manner turns in counterclockwise direction (arrow $f_1$) and thus drives the conveyor in the direction of arrow $f_2$.

As the conveyor travels opposite the cut away portion 29, the intervals between successive plates 18 are laden with skin chips (skin shreds for example) either by hand or mechanically for example through a hopper or a distributing device constructed and driven to operate in synchronism with the conveyor.

The extracting liquid is continuously fed through duct 8 and discharged through collecting basin 6 and pipe 7, laden with dissolved and suspended substances that have been capable of passing through the perforations in part 5. Such liquid thus moves according to the direction of arrow $f_3$ countercurrently with respect to skin bits.

The extracting liquid may be water; it may also be a dilute aqueous solution of reagents capable of bleaching gelatin and/or promoting extraction of collagen material by water; as examples of such reagents I shall cite sulphur dioxide, hydrogen peroxide, zinc sulphate, phosphoric acid, potassium permanganate and the like, but I do not restrict myself to those specific substances.

As to the proportion of extracting liquid with respect to skin shreds, it is variable according to the gelatin concentration which it is desired to obtain; in actual practice, for the sake of convenience, it generally amounts to at least 4-5.

The pressure prevailing in the extraction passageway increases from the outlet of duct 8 to the base of the U then decreases therefrom to the perforated zone 5 where expressed in terms of water head, it is still substantially equal to the elevation $h_1$ of the outlet of duct 8 above the level of basin 6 (plus as the case may be any initial pressure at the outlet of said duct 8); a maximum pressure equal to $h_1-h_2$ prevails in the horizontal base of the U. The maximum pressure thus depends on height $h_1-h_2$; in common practice, it is desirable to work at a temperature which is not above 105° C. for a rate of treatment of 45 kgs. of skin per hour and since the temperature should preferably lie below the boiling point of the extracting liquid, a limit is thus fixed for the maximum pressure. The period of time for extraction is lower as temperature and pressure are higher, and better grades of gelatin are obtained as extraction has been performed in a shorter time.

The extracting liquid passes from the interval between any two successive plates 18, to the next interval through the perforations 19 in the intermediate plate and eventually reaches the perforated zone 5 of the U tube or tube section assembly, after passing through all intervals and being distributed in the mass of skin bits that said intervals contain.

Exhausted skin bits fall from the exit end of extension 3, for example in a hopper which delivers them to a rotary drying apparatus not shown for subsequent treatment for the purpose of fertilizer production.

The apparatus as above described may be altered to suit particular requirements.

Firstly it is desirable especially with skin shreds or other residues which have a tendency at the end of the operation to build a mass liable to clog perforations 19 in plates 18, to provide by-passes in order that fresh extracting liquid can move round such a hardly penetrable mass; for this purpose, it is only necessary to provide laterally with respect to the tubular passageway in which the conveyor travels, by-pass passages extending over a length equal to or greater than the interval between two successive plates 18.

Figure 3:
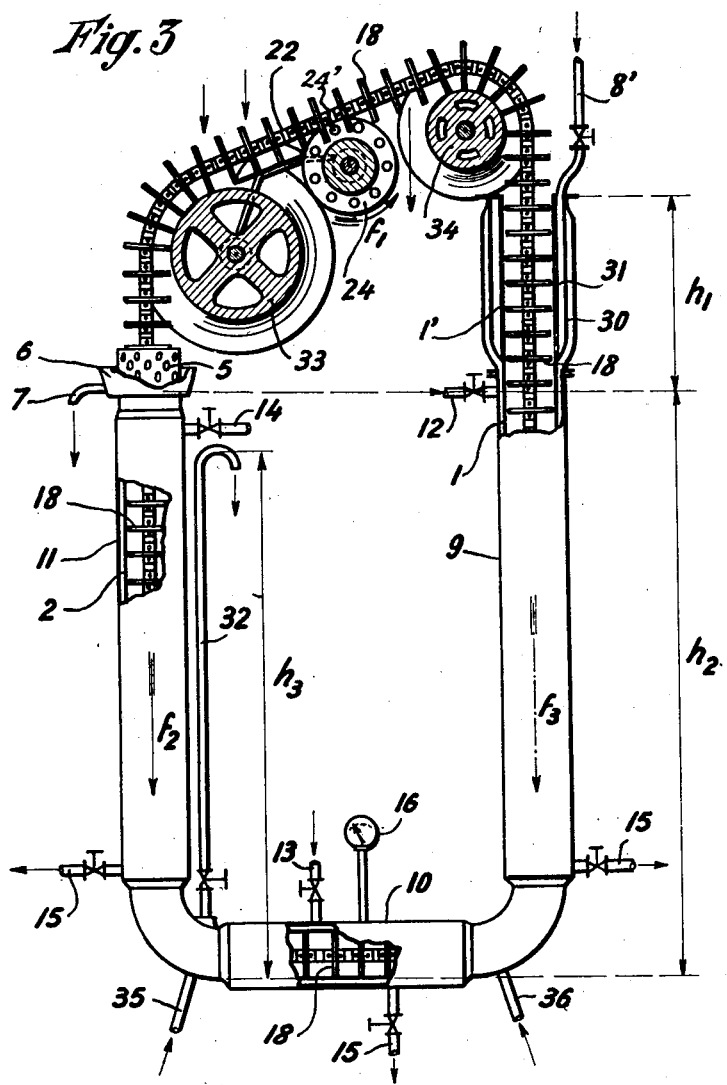
Figs. 3 and 4 are views analogous to Figs. 1 and 2 respectively, illustrating modifications.

Fig. 3 illustrates a desirable embodiment of such a by-pass device. The upper portion of the right-hand leg 1 is of openwork formation as shown at 1', and arranged around the same but spaced apart therefrom is a tubular casing 30 defining a by-pass 31 through which water or other scrubbing liquid introduced through duct 8', can pass around little penetrable masses of starting materials confined between plates 18, until said liquid meets less compact and consequently more easily penetrable skin shreds cakes at points downwards. Around casing 30, along a part or the whole length thereof, a further casing 9' may be arranged to define a heating jacket in association therewith.

Secondly, it is opportune to remind that fresh skins not yet subjected to extraction in the apparatus described contain a considerable proportion of water. Through the extraction treatment in the heat, water thus retained in skins plays the part of a solvent under the influence of heat, in parallel with the same part as is played by external water fed through duct 8 for the same purpose. Two broths or stocks are thus produced which become more and more concentrated and at some point in the apparatus they have the same specific gravity and maximum concentration. Such a point is generally found to lie towards the downstream end of the horizontal portion of the U passageway, and it is then desirable to withdraw gelatin broth from the passageway at this point.

A modification of the apparatus conceived to enable such a withdrawal to be effected has also been illustrated on Fig. 3 although it should be understood that it needs not be necessarily combined with the provision of by-pass means. According to this modification, broth withdrawal means are provided which extend upwardly to a height $h_3$ preferably less than $h_2$.

Figure 2:
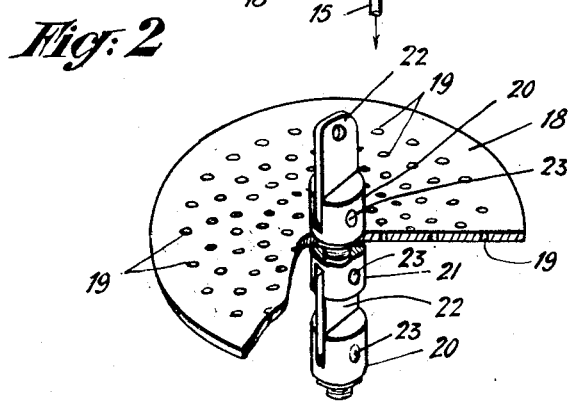
Fig. 2 is a perspective, partly exploded view of a portion of the conveyor present in the apparatus.

From the standpoint of mechanical arrangement, the following two changes may also be made separately or in combination:

1. The bent extensions 3, 4 may be omitted while pulleys 33, 34 are added (Fig. 3).
2. Instead of links 22, I may provide universal joint couplings, particularly links 22' (Fig. 4) pivotally connected with clevises 20, 21 through perpendicular pins 23, 23' instead of parallel pins as shown on Fig. 2, with a view to giving to conveyor a greater degree of flexibility.

An apparatus as above described is deemed to afford a plurality of advantages, many of which generally are attributable as well to the process according to this invention.

In the first place, the treatment is effected continuously and the starting material is methodically exhausted by reason of the countercurrent contact with the extracting medium; the extent to which exhaustion is performed can be adjusted by varying the maximum pressure as will hereinafter be described, and/or by varying the speed of the conveyor; hence exhaustion can be effected to a maximum extent.

Although the apparatus is open at the top thereof and consequently is free from complications as attendant to autoclaves, extraction takes place therein under pressure, and it will be obvious that the maximum pressure can be varied by changing the length of the U legs or setting the plane of the U at an angle with the vertical plane, and the period of time of exposure to maximum pressure can be varied by altering the length of the U base or suitably rating the velocity of travel of the conveyor with reference to said length.

In particular, and especially owing to extraction methodicity as well as heating provision, it is possible to effect conversion and extraction of collagen material in a minimum period of time and at optima temperatures, thereby securing the best grade for the product.

Extraction of collagen material and heat transfer are easier by reason of stirring of the mass and gradual increase then also gradual decrease of effective pressure.

The apparatus above described is suitable for treating any animal materials containing gelatin, that is not only skins (particularly rabbit skins) but also bones and the like.

The thermic efficiency, i. e. the efficiency of employment of heat supplied, is high, and it is easy to provide heat insulation of the apparatus.

Furthermore, as above stated, the treatment may be effected in acid or basic medium, subject to selecting suitable materials in constructing the apparatus.

It is further possible to combine two or more apparatuses as above described for the purpose of securing desirable results. In particular, the starting materials may be passed through an apparatus one or more critical factors of which (dimensions, conveyor speed, temperatures or temperature gradients) are so calculated that a rapid hydrolysis takes place therein for obtaining a broth of poor grade (for instance having a gelatin content of 0.5 to 1 per cent); such a previous treatment results in reducing the bulk of material to be treated (viz. skins, bones and the like) to an extent that may reach about 50 per cent.

The materials of reduced bulk thus obtained may then be passed through a second apparatus of the same kind (for example in a transverse plane at an angle with the plane of the first apparatus so that solid residues are delivered from said first apparatus above the inlet provided for starting material in the second apparatus) and from the second apparatus, a concentrated broth can be obtained directly since by reason of the reduction of bulk of the materials previously treated in the first apparatus, it is possible to feed the equivalent of a larger portion of the original material in each plate interval. It is then possible to do away with the employment of conventional concentrating apparatus, so that the period of time for which broths are exposed to high temperatures is shortened thereby and the gelatin grade is improved.

The critical factors for the second apparatus may further be selected in order that exhaustion does not go to completion therein and consequently neither head broths nor tail broths which generally are of poor quality are obtained in said second apparatus. Finally, if it is desired, the broth is recovered from the first extraction may be used as an extracting medium, instead of pure water for effecting the second extraction It will finally be realized that the process and apparatus above described are applicable to the treatment of coherent materials by means of liquid extracting agents or even gaseous agents provided the apparatus is closed at the top, particularly for the production of mucilages, vegetable adhesives, tanning extracts from vegetables such as sea-weeds, wood, barks and the like. An additional physical or chemical treatment may also be effected, for example a bleaching treatment by means of an oxidizing or a reducing agent; in this respect inlet pipes 35, 36 for delivery of sulphur dioxide are shown on Fig. 3; alternatively either one pipe or more than two may be provided.

The following examples which are not restrictive will illustrate the manner of carrying out my invention.

*Example 1*

Figure 4:
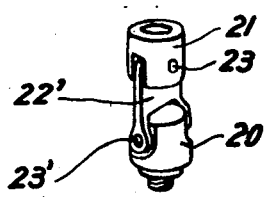

The apparatus on use was constructed as shown on Figs. 3 and 4. The tubular guide had an inner diameter of 150 mm.; the heights $h_1$ and $h_2$ were respectively 1.50 m. and 4 m.; the conveyor pitch, i. e. the distance between successive plates, amounted to 75 mm. At the feeding place, 45 kgs. (dry weight) of previously washed skin shreds were laden between the conveyor plates so as to fill the whole tubular guide. Water was then supplied through duct 8' until it was discharged through spout 7, then heating steam was passed through the jackets around the vertical legs and the horizontal base of the U tubular guide. After heating for 30 minutes at about 100° C., the conveyor was set in motion, and further skin shreds were laden at a rate of 45 kgs. (dry weight) an hour. Through the withdrawal pipe 32, a 25 per cent broth was withdrawn to be subsequently treated according to conventional procedure. The broth thus obtained showed the following characteristic: at a concentration of 10 per cent, its melting point was 37° C. and its gelling point 29° C. Samples of skin shreds taken from the same batch were extracted according to conventional practice: at a concentration of 10 per cent, the melting point of the broth was 33° C. and the gelling point 24° C.

When sulphur dioxide was supplied through pipes 35, 36, at a rate of about 1 kg. per hour, either as a gas or as an aqueous solution thereof, an altogether clear and uncolored broth was obtained.

Alternatively hydrogen peroxide, persulphates or any other bleaching agent might be employed, and were continuously supplied, for example through pipes 35, 36, during the extraction process.

*Example 2*

Where two apparatuses were combined as above described, I operated as follows: 90 kgs. of skin shreds per hour were passed through a first apparatus having half the capacity of the apparatus referred to in Example 1, counter-currently with the amount of water at a temperature of about 70–80° C. required to obtain a broth or stock containing 1 per cent gelatin; such an amount was about 200 litres. The volume or bulk of skin shreds was thus reduced to 50 per cent of its original value. A "head" broth of stock of poor grade was thus discarded. 90 kgs. of the skin shreds thus recovered could then be treated per each hour as disclosed in Example 1 in a second apparatus which could otherwise treat only 45 kgs. of fresh skin shreds per hour. The proportion of extracting liquid in the second apparatus might then be reduced to about 3 times the weight of pretreated skin shreds.

By applying the same starting steps as in the case of skin shreds, it is likewise possible continuously to treat previously washed sea-weeds by means of a dilute aqueous solution of sodium carbonate, the velocity of the conveyor being so adjusted as to provide for total extraction.

What I claim is:

1. In the production of gelatin products, the steps of continuously passing skin shreds countercurrently with a hot aqueous agent adapted to hydrolyze the collagen in said shreds to gelatin and to extract the gelatin so formed through an elongated extraction zone; maintaining a gradient of rising pressure in said zone from an end thereof to an intermediate portion of the same and a gradient of falling pressure from said intermediate portion to the other end of said zone; continuously supplying heat to said zone; continuously withdrawing a portion of said extracting agent from said zone at a point between the point of ingress of said agent into said intermediate portion of said zone and the shred exit end of said zone and withdrawing the remainder of said extracting agent from said shred entrance end of said zone.

2. In the production of gelatin products, the steps of continuously passing skin shreds countercurrently with an aqueous agent adapted to hydrolyze the collagen in said shreds to gelatin and to extract the gelatin so formed through a first extraction zone while maintaining in said zone a pressure which increases from an end of said zone to an intermediate portion of the same then decreases from said intermediate portion to the other end of said zone; then separating said skin shreds from said extracting agent; and continuously passing the skin shreds thus separated through a second extraction zone countercurrently with a smaller proportion of an aqueous agent adapted to hydrolyze the collagen in said shreds to gelatin and to extract the gelatin so formed and at a higher temperature than in the first zone, while maintaining in said second extraction zone a pressure which increases from an end of said zone to an intermediate portion of the same then decreases from said intermediate portion to the other end of said second extraction zone.

3. In the continuous production of gelatin products, the steps of passing skin shreds in the form of a bead of separate, successive, loose packs thereof with an interval between two successive packs, through an extraction zone; maintaining a body of a hot aqueous agent adapted to hydrolyze the collagen in said shreds to gelatin and to extract the gelatin so formed in and around the pack exit section of said zone, to cause said packs to pass through said body; supplying said body with hot aqueous agent adapted to hydrolyze the collagen in said shreds to gelatin and to extract the gelatin so formed; withdrawing agent from said body at the end thereof remote from the pack exit and passing the agent thus withdrawn countercurrently with said bead of packs through the portion of said zone excluding the said pack exit section; maintaining in said zone a pressure which increases from the pack exit end thereof to an intermediate section of said zone then decreases from said intermediate section to the pack inlet end of the zone; withdrawing a portion of said agent from said zone at a point between the point of ingress of said agent into said intermediate section and the pack inlet end of said zone; and withdrawing the remainder of said agent from said pack inlet end of said zone.

RENÉ E. A. J. FRECHIN.

REFERENCES CITED

The following references are of record in the file of this patent:

UNITED STATES PATENTS

| Number | Name | Date |
| --- | --- | --- |
| 2,474 | Poulson | Feb. 28, 1842 |
| 247,573 | Milligan | Sept. 27, 1881 |
| 276,256 | Mathieu | Apr. 24, 1883 |
| 1,431,217 | Collard | Oct. 10, 1922 |
| 2,273,557 | Bonotto | Feb. 17, 1942 |
| 2,301,242 | Billaudot | Nov. 10, 1942 |
| 2,397,973 | Mueller | Apr. 9, 1946 |
| 2,425,335 | Messing | Aug. 12, 1947 |